United States Patent Office 3,426,081
Patented Feb. 4, 1969

3,426,081
PROCESS FOR PREPARING BIS(3,5,6-TRICHLORO-2-HYDROXYPHENYL) METHANE
Samuel Shore, Roselle, Thaddeus M. Muzyczko, Melrose Park, and Jerome A. Martin, Chicago, Ill., assignors to The Richardson Company, Melrose Park, Ill., a corporation of Ohio
No Drawing. Filed July 18, 1966, Ser. No. 565,693
U.S. Cl. 260—619            9 Claims
Int. Cl. C07c *37/20, 39/16*

ABSTRACT OF THE DISCLOSURE

A process for preparing bis(3,5,6-trichloro-2-hydroxyphenyl) methane without expensive chlorinated solvents by reacting the phenol and formaldehyde at a temperature of about 70–85° C. in a large amount of sulfuric acid to form a precipitate of the product which is then recovered without diluting the acid catalyst.

---

This invention relates to a process for the preparation of bis(3,5,6-trichloro-2-hydroxyphenyl) methane without the use of expensive chlorinated solvents and the necessity of their recovery, and more particularly to a process which also results in high yields of the product.

Bis(3,5,6-trichloro-2-hydroxyphenyl) methane is a well-known composition exhibiting useful bactericidal and fungicidal properties. It is used commercially in soaps, ointments, and toilet creams.

The preparation of bis(3,5,6-trichloro-2-hydroxyphenyl) methane involves the condensation reaction of 2,4,5-trichlorophenol with a formaldehyde-yielding substance such as paraformaldehyde, formalin, trioxane, and the like, in the presence of a sulfuric acid catalyst. As evidenced by such patents as U.S. 2,250,480, U.S. 2,435,592, and U.S. 2,812,365 which issued in 1941, 1948 and 1957, respectively, this process has been subject to modifications over the years to improve various aspects of the process. As described in the second and third patents, these modifications were directed to reducing the amount of sulfuric acid and to the use of elevated temperatures, and then to the use of chlorinated solvent. While the use of small amounts of acid reduced the excessive formation of alkali metal sulfates or dilute acid solutions when the reaction mixture was made alkaline in the process, the improvement of the third patent was necessary to further avoid the loss of acid. The resultant process utilizes the chlorinated solvent and it is usually necessary to recover the expensive solvent by techniques such as steam distillation which not only add to the complexity of the process but also to its expense.

Surprisingly, we have discovered that the process can be carried out without the expensive chlorinated solvent and under conditions which produce high yields of product. In addition, our process avoids the excessive loss of acid and the appreciable formation of colored contaminants.

Briefly, our invention is directed to a process of producing bis(3,5,6-trichloro-2 - hydroxyphenyl) methane wherein the improvement comprises carrying out the reaction of 2,4,5-trichlorophenol with a formaldehyde-yielding substance without the chlorinated solvent and in the presence of a large amount of sulfuric acid as a combination catalyst and dispersing medium, and at a temperature in the range of about 70–85° C. to produce the product as a precipitate, and recovering the product from the acid solution by separation such as by centrifugation.

The combination of a large amount of acid catalyst with the particular temperature range provides an environment in which the reaction is quickly completed without the appreciable formation of colored contaminants. The resulting precipitated product is then conviently separated from the acid and can be treated with solutions of base without the excessive loss of acid previously encountered. The above and other advantages characterize the process as an important contribution to the art.

As described in the aforementioned patents, the process involves the condensation reaction of 2,4,5-trichlorophenol with a formaldehyde-yielding substance. Usually and advantageously, the formaldehyde-yielding substance is present in at least a mole ratio of 1:2 in respect to the phenol with values in the order of 25 percent excess providing very suitable results.

The process also involves the use of a sulfuric acid catalyst. Usually, the acid is concentrated or as oleum, with values of concentration commonly being in the order of 85–100 percent $H_2SO_4$. Advantageously, the acid includes concentrations of 95 percent and above, oleum, and combinations thereof. In our process, the acid is present in large amounts as a combination catalyst and dispersing medium since 2,4,5-trichlorophenol is not completely soluble in it. The large amounts of acid are usually equal to at least the weight of the phenol more commonly, they are 1–3 and advantageously about 1–2 times the weight of the phenol.

The reaction is carried out at a temperature in the range of about 70–85° C. and more advantageously about 70–80° C. The use of these temperatures aids in avoiding excessive formation of colored contaminants. The reaction is carried out at these temperatures for a time necessary to produce the product. Times in the order of 20 minutes are common.

The process results in a bis(3,5,6-trichloro-2-hydroxyphenyl) methane product as a precipitate which can be separated by centrifugation, filtration, or the like, and does not require recrystallization from a solvent in its purification.

The process also results in high yields with values of 80–90 percent being common. These values are based on the 2,4,5-trichlorophenol.

In the separation, the major portion of the acid is recovered and is available to be reused either at a slightly lower concentration (above 85 percent $H_2SO_4$) or reconcentrated with oleum.

The precipitated bis(3,5,6-trichloro-2-hydroxyphenyl) methane product is then purified by forming its water-soluble salt in solution, and regenerating the insoluble bis(3,5,6-trichloro-2-hydroxyphenyl) methane from the salt. As described in U.S. 2,435,593, the salt is usually a water-soluble, di-alkali metal salt and the regeneration includes the formation of an insoluble mono-alkali metal followed by recovery of bis(3,5,6-trichloro-2-hydroxyphenyl) methane in a relatively pure form. Advantageously, these alkali metal salts are sodium salts.

In the process, it is preferable to use a moderately high purity 2,4,5-trichlorophenol to avoid problems with impurities. Usually, the phenol is at least 90 percent pure and preferably is at least about 95 percent pure.

As described above, the process is advantageously carried out with a mole ratio of formaldehyde-yielding substance to 2,4,5-trichlorophenol of about 1–1.3:2, with the amount of acid being about 1–2 times the weight of the phenol, and at a temperature in the range of about 70–80° C. The bis(3,5,6-trichloro-2-hydroxyphenyl) methane precipitate is advantageously recovered by centrifugation or filtration and further treated to form a water-soluble salt in solution and then recovered in an insoluble form.

The following example illustrates some of the embodiments of this invention. It is to be understood that these are for illustrative purposes only and do not purport to be wholly definitive to conditions or scope.

EXAMPLE I

A 1-liter, three-neck, round bottom reaction flask was fitted with a thermometer and reflux condenser. Stirring was provided by a motor driven paddle agitator. Heating was supplied by an electric heating mantle.

The reaction flask was charged with approximately 98.7 grams (0.5 mole) of 2,4,5-trichlorophenol and 303.0 grams of concentrated $H_2SO_4$ (96%). The flask temperature was raised to 65–70° C. to disperse the mixture. Paraformaldehyde (approximately 8.7 grams or 0.25 mole) was added in .5 gram increments at about 5 minute intervals, keeping the temperature at 72–75° C. As the reaction proceeded, the product settled out as a white granular precipitate. After the last addition of paraformaldehyde the mixture was agitated at 70° C. for 10 minutes, then filtered through glass filter paper in a Buchner funnel. Approximately 50–55 percent of the $H_2SO_4$ was removed.

The crude cake [bis(3,5,6-trichloro-2-hydroxyphenyl) methane] was washed with water, while still in the filter funnel, and then dispersed in 1000 ml. of water where it was neutralized with 50% NaOH to a pH of 11.5. This solution was filtered and a small amount of residue (about 1–2 grams) was removed. The filtrate was neutralized with 50% $H_2SO_4$ to a pH of 10.3 which resulted in a white precipitate that was the monosodium salt. This salt was washed with water, filtered and redispersed in 1000 ml. of water where the pH was adjusted to about 3.0 using dilute hydrochloric acid. This product [bis(3,5,6-trichloro-2-hydroxyphenyl) methane] was washed with water, until the filtrate was near neutral, then dried to constant weight in a vacuum oven (16 hours, 54° C., 29.0 inches Hg vacuum). A total of 90.0 grams of product was recovered (88.5% yield). The product exhibited a melting point of 163–164° C.

While the invention has been described in conjunction with a specific example thereof, this is illustrative only.

We claim:

1. In the process for preparing bis(3,5,6-trichloro-2-hydroxyphenyl) methane by reacting 2,4,5-trichlorophenol and a formaldehyde yielding substance, the improvement which comprises reacting the phenol of at least 95% purity and formaldehyde yielding substance in a mole ratio of formaldehyde substance to phenol of about 1–1.3:2 at a temperature in the range of about 70–85° C. and in the presence of a large amount of sulfuric acid of concentrations of 85 to 100 percent as a combination catalyst and dispersing medium, said amount being at least equal to the weight of the phenol, said reaction being carried out to produce a precipitated produce of bis(3,5,6-trichloro-2-hydroxyphenyl) methane, and recovering the product by separation.

2. The process of claim 1 which includes purifying the precipitated product by forming a water soluble salt of the bis(3,5,6-trichloro-2-hydroxyphenyl) methane in solution and regenerating the insoluble bis(3,5,6-trichloro-2-hydroxyphenyl) methane from the salt.

3. The process of claim 1 wherein the 2,4,5-trichlorophenol is of at least 95% purity, the formaldehyde yielding substance is present in a mole ratio to the phenol of about 1–1.3:2, and the amount of sulfuric acid present is about 1–2 times the weight of the phenol.

4. The process of claim 3 wherein the separation is carried out by filtration.

5. The process of claim 3 wherein the separation is carried out by centrifugation.

6. The process of claim 3 wherein the temperature is about 70–80° C.

7. The process of claim 6 which includes purifying the precipitated bis(3,5,6-trichloro-2-hydroxyphenyl) methane product by forming its water soluble salt in solution, and regenerating the insoluble bis(3,5,6-trichloro-2-hydroxyphenyl) methane from the salt.

8. The process of claim 7 wherein a water soluble, di-alkali salt of bis(3,5,6-trichloro-2-hydroxyphenyl) methane is formed, and the regeneration includes the formation of its insoluble mono-alkali salt and its conversion to bis(3,5,6-trichloro-2-hydroxyphenyl) methane.

9. The process of claim 8 wherein the alkali metal salts are sodium salts.

References Cited

UNITED STATES PATENTS 2,353,725   7/1944   Gump.
2,435,593   2/1948   Luthy et al.

LEON ZITVER, *Primary Examiner.*

H. ROBERTS, *Assistant Examiner.*